United States Patent
Zhang et al.

(10) Patent No.: US 11,900,189 B1
(45) Date of Patent: Feb. 13, 2024

(54) AUTOMATIC TUNING COMPENSATION SYSTEM THAT DETERMINES OPTIMAL COMPENSATION TARGET VALUES FOR EACH OF PLURALITY OF TINT LEVELS

(71) Applicants: Ziling Zhang, Boulder, CO (US); Farnaz Hajiahmadi Foomani, Milwaukee, WI (US); Mikel Stanich, Boulder, CO (US)

(72) Inventors: Ziling Zhang, Boulder, CO (US); Farnaz Hajiahmadi Foomani, Milwaukee, WI (US); Mikel Stanich, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/171,835

(22) Filed: Feb. 21, 2023

(51) Int. Cl.
*G06K 15/02* (2006.01)
*G06K 15/10* (2006.01)
*G06V 10/56* (2022.01)

(52) U.S. Cl.
CPC ....... *G06K 15/1881* (2013.01); *G06K 15/105* (2013.01); *G06K 15/1822* (2013.01); *G06K 15/1878* (2013.01); *G06V 10/56* (2022.01)

(58) Field of Classification Search
None
See application file for complete search history.

(56) References Cited

U.S. PATENT DOCUMENTS

| 6,270,187 | B1 | 8/2001 | Murcia et al. |
| 7,024,126 | B2 | 4/2006 | Kellie et al. |

(Continued)

FOREIGN PATENT DOCUMENTS

| CN | 107709015 | 2/2018 |
| CN | 110871626 | 3/2020 |

(Continued)

OTHER PUBLICATIONS

Notice of Allowance for U.S. Appl. No. 17/684,270, dated Jul. 11, 2023, 13 pages.

(Continued)

*Primary Examiner* — Haris Sabah
(74) *Attorney, Agent, or Firm* — Jaffery Watson Mendonsa Hamilton LLP

(57) ABSTRACT

A printing system is disclosed. The printing system includes at least one physical memory device to store compensation logic and one or more processors coupled with the at least one physical memory device to execute the compensation logic to receive measurement data corresponding to a print medium printed with a plurality of non-functioning pel forming elements, a plurality of functioning pel forming elements and a plurality of tint levels; wherein adjacent ones of the plurality of functioning pel forming elements print with compensation transfer functions applied and are located adjacent to the plurality of non-functioning pel forming elements, associate measurement data with the plurality of non-functioning pel forming elements, the compensation transfer functions and the plurality of tint levels and determine optimal compensation by selecting the compensation transfer functions that have corresponding measurement data values closest to compensation target values for each of the plurality of tint levels.

20 Claims, 17 Drawing Sheets

(56) References Cited

U.S. PATENT DOCUMENTS

| | | | |
|---|---|---|---|
| 7,085,002 B2 | 8/2006 | Ilbery et al. | |
| 7,289,248 B2 | 10/2007 | Yamazaki | |
| 7,306,312 B2 | 12/2007 | Chiwata | |
| 7,362,472 B2* | 4/2008 | Couwenhoven | H04N 1/52 358/3.05 |
| 7,483,171 B2 | 1/2009 | Agar | |
| 7,538,909 B2 | 5/2009 | Ilbery et al. | |
| 7,585,038 B2 | 9/2009 | Shibata et al. | |
| 8,033,630 B2 | 10/2011 | Miyamoto | |
| 8,157,345 B2 | 4/2012 | Sasyama | |
| 8,262,190 B2 | 9/2012 | Mizes et al. | |
| 8,322,811 B2 | 12/2012 | Chandu et al. | |
| 8,511,788 B2 | 8/2013 | Inoue | |
| 8,542,418 B2 | 9/2013 | Chandu | |
| 8,573,731 B2 | 11/2013 | Bastani et al. | |
| 8,699,103 B2 | 4/2014 | Mestha et al. | |
| 8,807,684 B2 | 8/2014 | Allworth et al. | |
| 8,967,757 B2 | 3/2015 | Bastani et al. | |
| 9,108,402 B2 | 8/2015 | Sudo | |
| 9,218,645 B2 | 12/2015 | Shibata | |
| 9,302,469 B2 | 4/2016 | De Grijs | |
| 9,463,638 B1 | 10/2016 | Kroon | |
| 9,573,382 B1 | 2/2017 | Metcalfe | |
| 9,621,762 B2 | 4/2017 | Chandu et al. | |
| 9,661,154 B1 | 5/2017 | Stanich et al. | |
| 9,738,066 B1 | 8/2017 | Kroon | |
| 9,914,309 B2 | 3/2018 | Billow et al. | |
| 10,082,990 B2 | 9/2018 | Martin et al. | |
| 10,105,948 B2 | 10/2018 | Ueshima | |
| 10,158,788 B2* | 12/2018 | Okuyama | H04N 1/6072 |
| 10,214,038 B2 | 2/2019 | Klinger et al. | |
| 10,442,211 B2 | 10/2019 | Stanich | |
| 10,449,759 B2 | 10/2019 | Trachanas et al. | |
| 10,488,846 B2 | 11/2019 | Donovan | |
| 10,538,106 B2 | 1/2020 | Stritzel | |
| 10,696,062 B2 | 6/2020 | Hauck et al. | |
| 10,953,665 B2 | 3/2021 | Billow | |
| 11,184,504 B2 | 11/2021 | Stanich et al. | |
| 11,216,710 B1 | 1/2022 | Stanich | |
| 11,270,171 B2 | 3/2022 | Fukui | |
| 11,281,950 B2 | 3/2022 | Otani | |
| 11,318,753 B2 | 5/2022 | Kikuchi | |
| 11,338,591 B1 | 5/2022 | Kailey | |
| 11,368,592 B1 | 6/2022 | Kailey et al. | |
| 11,443,152 B1 | 9/2022 | Stanich | |
| 11,539,857 B2 | 12/2022 | Kailey | |
| 11,630,975 B1 | 4/2023 | Terrab | |
| 11,632,487 B1 | 4/2023 | Terrab | |
| 11,636,296 B1 | 4/2023 | Stanich | |
| 11,637,946 B2 | 4/2023 | Stanich | |
| 2002/0051144 A1 | 5/2002 | Ilbery et al. | |
| 2005/0099446 A1 | 5/2005 | Mizes et al. | |
| 2005/0243340 A1 | 11/2005 | Tai et al. | |
| 2006/0061782 A1 | 3/2006 | Yao | |
| 2006/0072160 A1 | 4/2006 | Yamazaki | |
| 2007/0115507 A1 | 5/2007 | Terekhov et al. | |
| 2009/0067006 A1* | 3/2009 | Kobayashi | H04N 1/4055 358/3.06 |
| 2009/0284762 A1 | 11/2009 | Zhang et al. | |
| 2010/0207983 A1 | 8/2010 | Hiroyuki | |
| 2012/0050755 A1 | 3/2012 | Chandu | |
| 2012/0249550 A1* | 10/2012 | Akeley | H04N 21/6582 345/419 |
| 2013/0021400 A1 | 1/2013 | Tamagawa | |
| 2013/0076825 A1 | 3/2013 | Szafraniee | |
| 2013/0176600 A1 | 7/2013 | Chandu | |
| 2013/0293611 A1 | 11/2013 | Ueshima | |
| 2014/0022601 A1 | 1/2014 | Okubo | |
| 2014/0071191 A1 | 3/2014 | Masashi | |
| 2014/0313255 A1 | 10/2014 | Ukishima | |
| 2015/0062233 A1 | 3/2015 | Ueshima | |
| 2016/0052318 A1 | 2/2016 | Humet Pous | |
| 2016/0100079 A1 | 4/2016 | Gerrits | |
| 2016/0309056 A1 | 10/2016 | Wakui | |
| 2017/0236041 A1 | 8/2017 | Stanich | |
| 2017/0280022 A1 | 9/2017 | Kuriowa | |
| 2018/0008995 A1 | 1/2018 | Baker et al. | |
| 2018/0022131 A1 | 1/2018 | Klinger et al. | |
| 2018/0234582 A1 | 8/2018 | Stanich et al. | |
| 2018/0236776 A1 | 8/2018 | Stanich et al. | |
| 2019/0389227 A1 | 12/2019 | Stanich et al. | |
| 2020/0064672 A1* | 2/2020 | Iwasaki | G02B 5/20 |
| 2020/0094546 A1 | 3/2020 | Samadzadegan | |
| 2020/0108632 A1 | 4/2020 | Billow | |
| 2020/0247137 A1 | 8/2020 | Ryosuke et al. | |
| 2020/0274991 A1 | 8/2020 | Stanich et al. | |
| 2021/0271431 A1 | 9/2021 | Stanich | |
| 2021/0339522 A1 | 11/2021 | Shibata | |
| 2022/0086826 A1 | 3/2022 | Stanich | |
| 2022/0286578 A1 | 9/2022 | Stanich | |
| 2022/0286581 A1 | 9/2022 | Kailey | |
| 2022/0288945 A1 | 9/2022 | Kailey | |
| 2023/0120258 A1 | 4/2023 | Stanich | |
| 2023/0123461 A1 | 4/2023 | Stanich | |

FOREIGN PATENT DOCUMENTS

| | | |
|---|---|---|
| EP | 1197916 A2 | 4/2002 |
| EP | 1157840 B1 | 7/2007 |
| JP | 4604614 B2 | 1/2011 |
| JP | 2018133801 | 8/2018 |
| JP | 2018167492 | 11/2018 |
| WO | 2008059264 A1 | 5/2008 |

OTHER PUBLICATIONS

Office Action for U.S. Appl. No. 17/684,266, dated Jul. 5, 2023, 15 pages.

Jin, Y. A., He, Y., Gao, Q., Fu, J. Z., & Fu, G. Q. (2014). Droplet deviation modeling and compensation scheme of inkjet printing. The International Journal of Advanced Manufacturing Technology, 75(9-12), 1405-1415. See highlighted sections.

Notice of Allowance for U.S. Appl. No. 17/684,275, dated Feb. 1, 2023, 8 pages.

Office Action for U.S. Appl. No. 17/684,275, dated Dec. 8, 2022, 16 pages.

Hansen et al., "High-Throughput Printing via Microvascular Multinozzle Arrays", Advanced Materials, 25(1), pp. 96-102.

Vantram, S. R. (2014). Fully Automated Calibration Procedure to Compensate Print Non-uniformities Incurred in Fixed Print-head Array Structures. Retrieved from https://jp.ricoh.com/~/Media/Ricoh/Sites/jp_ricoh/technology/techreport/39/pdf/RTR39a18.pdf See highlighted sections.

Extended European Search Report for EP21191026.0, 11 pages, dated Jan. 5, 2022.

International Search Report and Written Opinion for PCT/JP2022/009086, dated Jun. 2, 2022, 12 pages.

International Search Report and Written Opinion for PCT/JP2022/008654, dated Jun. 17, 2022, 15 pages.

Extended European Search Report for EP22159749, dated Jul. 19, 2022, 8 pages.

U.S. Appl. No. 17/684,270, filed Mar. 1, 2022 (currently unpublished).

U.S. Appl. No. 17/684,275, filed Mar. 1, 2022 (currently unpublished).

U.S. Appl. No. 17/684,281, filed Mar. 1, 2022 (currently unpublished).

U.S. Appl. No. 17/684,266, filed Mar. 1, 2022 (currently unpublished).

* cited by examiner mult_array(:,:,1) =

254 230 90 16 2 25 82 222
247 214 132 41 8 58 156 189
99 148 181 140 74 123 173 107
33 66 165 206 239 197 115 49
2 25 82 222 255 230 90 16
8 58 156 189 247 214 132 41
74 123 173 107 99 148 181 140
239 197 115 49 33 66 165 206 mult_array(:,:,2) =

252 228 88 14 1 22 80 219
244 211 129 38 5 55 154 186
96 145 178 137 71 121 170 104
30 63 162 203 236 195 112 47
1 22 80 219 252 228 88 14
5 55 154 186 244 211 129 38
71 121 170 104 96 145 178 137
236 195 112 47 30 63 162 203 mult_array(:,:,3) =

250 225 85 11 0 19 77 217
241 208 126 36 3 52 151 184
93 143 175 134 69 118 167 101
27 60 159 200 233 192 110 44
0 19 77 217 250 225 85 11
3 52 151 184 241 208 126 36
69 118 167 101 93 143 175 134
233 192 110 44 27 60 159 200

AUTOMATIC TUNING COMPENSATION SYSTEM THAT DETERMINES OPTIMAL COMPENSATION TARGET VALUES FOR EACH OF PLURALITY OF TINT LEVELS

FIELD OF THE INVENTION

The invention relates to the field of image reproduction, and in particular, to uniformity compensation.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead contains many nozzles (e.g., inkjet nozzles) for the ejection of ink or any colorant suitable for printing on a medium.

Prior to commencing printing operations, compensation may be performed to compensate for measured response differences for a printhead nozzle which is not jetting properly. Compensation methods are based on uniformity compensation of nozzles. However, various nozzles may become defective which may lead to undesired changes (e.g., artifacts) in jetting output such as voids or banding. For example, some nozzles may be subject to jet-outs, while others may be affected by an overlap between printheads.

Current uniformity compensation relies on finding optimal jet-out compensation strength, which requires prior knowledge of ink spread and ink model simulation, or time consuming manual tuning performed by printer operators.

Accordingly, a mechanism to perform automatic tuning for jet-out compensation is desired.

SUMMARY

In one embodiment, a printing system is disclosed. The printing system includes at least one physical memory device to store compensation logic and one or more processors coupled with the at least one physical memory device to execute the compensation logic to receive measurement data corresponding to a print medium printed with a plurality of non-functioning pel forming elements, a plurality of functioning pel forming elements and a plurality of tint levels; wherein adjacent ones of the plurality of functioning pel forming elements print with compensation transfer functions applied and are located adjacent to the plurality of non-functioning pel forming elements, associate measurement data with the plurality of non-functioning pel forming elements, the compensation transfer functions and the plurality of tint levels and determine optimal compensation by selecting the compensation transfer functions that have corresponding measurement data values closest to compensation target values for each of the plurality of tint levels.

BRIEF DESCRIPTION OF THE DRAWINGS

A better understanding of the present invention can be obtained from the following detailed description in conjunction with the following drawings, in which.

DETAILED DESCRIPTION

A mechanism to perform automatic tuning for jet-out compensation is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
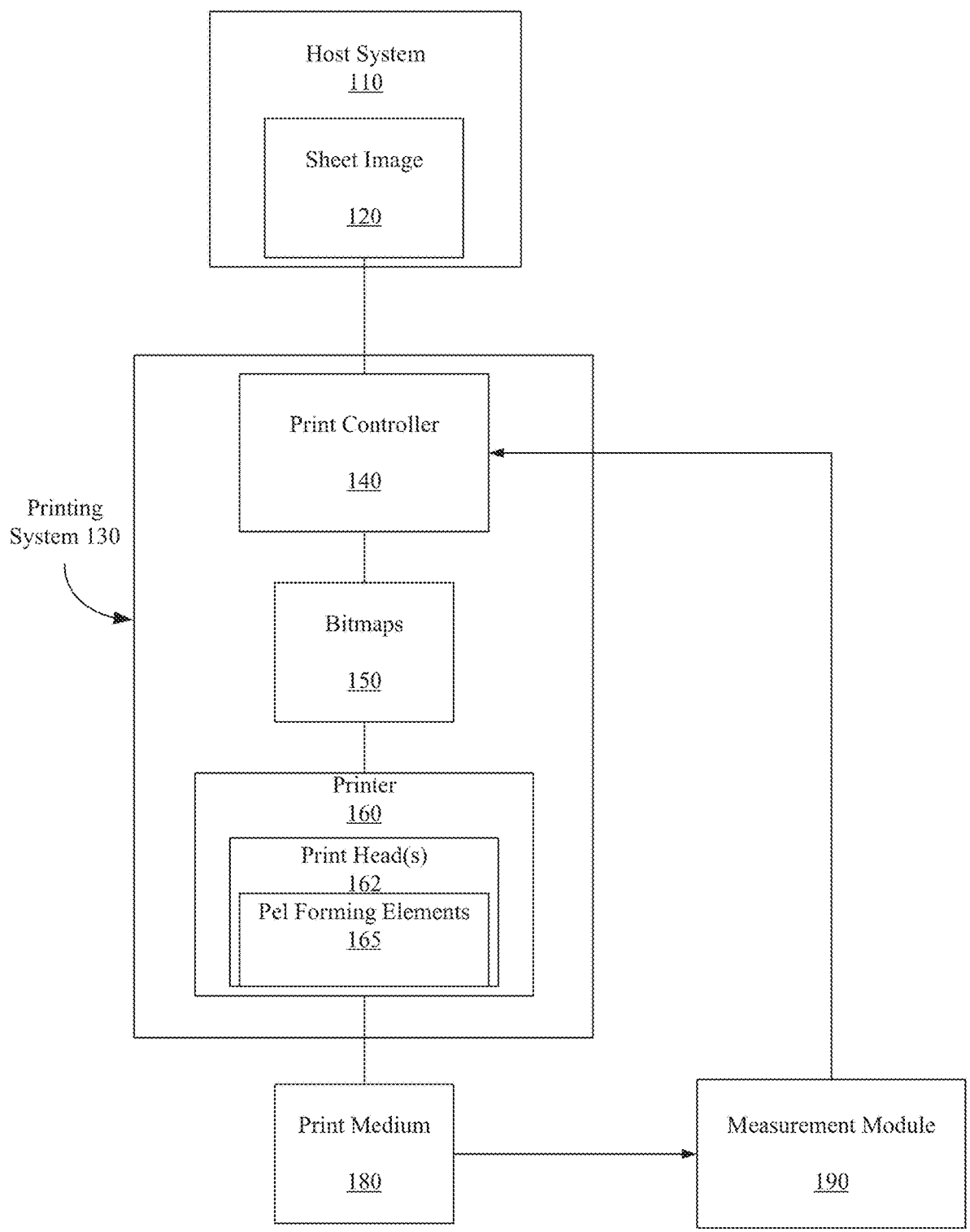
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. The pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head 162) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 includes the instructions (e.g., instructed ink drop size and/or instructed pel forming element location) for the one or more printheads 162 and pel forming elements 165. Bitmap 150 may be a halftoned bitmap (e.g., a compensated halftone bit map generated from compensated halftones, or uncompensated halftone bit map generated from uncompensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a compensation system to obtain measurements of the printed medium 180. The measured results are communicated to print controller 140 to be used in a compensation process. The measurement system may be a stand-alone process or be integrated into the printing system 130.

According to one embodiment, measurement module 190 may be a sensor to take measurements of printed images on print medium 180. Measurement module 190 may generate and transmit measurement data 222. Measurement data 222 may be OD (e.g., optical density), perceptual lightness (e.g., L* in the CIELAB color plane L*a*b*) and/or scanned image (e.g., RGB) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer.

In a further embodiment, measurement data 222 may include map information to correlate portions of the measurement data to the corresponding pel forming elements 165 that contributed to the printing of the portions of the measurement data. In another embodiment, the print instructions for a test chart (e.g., step chart or test master) provides the correlation of the portions of the measurement data to the corresponding pel forming elements that contributed to the printing of the portions of the measurement data.

Figure 2:
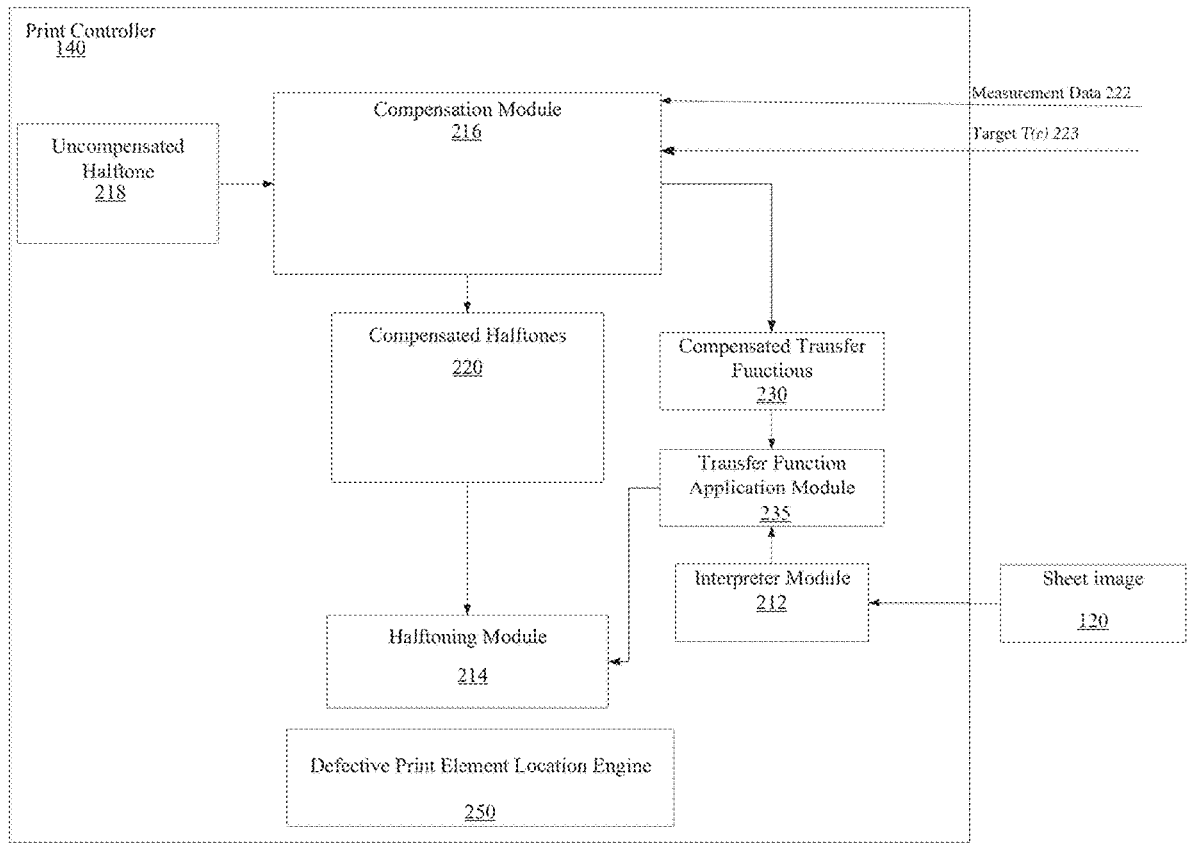
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a compensation module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, print controller 140 may implement transfer functions (e.g., compensate transfer functions) applied directly to image data as a part of the image processing prior to printing. In that case, the contone image data (CTI) is transformed (e.g., compensated) by the transfer functions prior to halftoning.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger instructed drop sizes, beginning with zero and ending with a maximum drop size (e.g., none, small, medium and or large). The halftone design may be implemented as threshold arrays (e.g., halftone threshold arrays) such as single bit threshold arrays or multibit threshold arrays). In another embodiment, the halftone design may include a three-dimensional look-up table with all included gray level values.

In a further embodiment, halftoning module 214 performs the multi-bit halftoning using the halftone design consisting of a set of threshold values for each pel in the sheetside bitmap, where there is one threshold for each non-zero ink drop size. The pel is halftoned with the drop size corresponding to threshold values for that pel. The set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone pel values in the sheetside bitmap.

This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

Figure 3A:
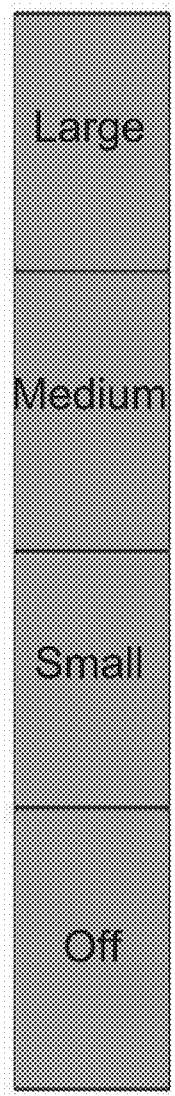
FIG. 3A illustrates one embodiment of multibit halftone designs, where the halftones are described using multi-bit threshold arrays (MTAs)

For multi-bit halftones, as shown in FIG. 3A, the MTA is a three-dimensional array including one two-dimensional array for each drop size transition. Thus an MTA includes a set of two-dimensional arrays of thresholds for transition between drop sizes: plane one provides the threshold for the Large output level, while plane 2 and plane 3 provide thresholds for the Medium and Small output levels respectively for a system having three drop sizes not including zero drop size (none or off). In other embodiments, different one-to-one relationship may be used since the correspondence between plane numbers and drop sizes is arbitrary.

To use these threshold arrays for halftoning, in the case where the threshold arrays are smaller than the sheetside map, each multibit threshold array is tiled across contone image data provided by the sheetside bitmap, which provides a set of threshold values for each pel in the sheetside bitmap. The contone image data (e.g., gray level data) is logically compared to the threshold data on a pel basis. In the case of Large drops, they are produced by the halftoning when the image contone data is greater than the respective large threshold values in plane 1.

Medium drops are produced when the image data is greater than the medium drop plane 2 thresholds and also the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values is less than or equal to the small drop thresholds in plane 3. In this embodiment of a two-bit multibit printing system, this set of four logical equations, used with thresholds from each plane of the multibit threshold array permit each printing drop size to be defined, based on the contone values.

In other embodiments, the number of planes of threshold data can be extended to handle any number of drop sizes. The data from these two-dimensional arrays may be segmented into separate memory regions and stored in any convenient order. For example, the thresholds for each drop size transition may be stored contiguously in memory, and it is often advantageous to do so.

Compensation module 216 performs a compensation process on an un-compensated halftone 218, or previously generated uniformity compensated halftone, received at print controller 140 to generate one or more compensated halftones 220. Compensated halftones 220 are then received at halftoning module 214 along with the sheetside bitmap. In one embodiment, an un-compensated halftone 218 represents a reference halftone design that is modified to create the compensated halftones. In such an embodiment, measurements of the system response (e.g., measurement data 222) are received via measurement module 190 using the un-compensated halftone 218 for printing the test chart.

According to one embodiment, compensation module 216 is implemented to perform uniformity compensation for defective pel forming elements 165. In such an embodiment, defective pel forming elements 165 may result from jet-outs. As used herein, uniformity compensation is defined as a calibration to compensate for measured response differences at a single pel, by a pel forming element 165 (e.g., print head nozzle).

Compensation module 216 also performs a compensation process to generate compensated transfer functions 230. Compensated transfer functions 230 are then received at transfer function application module 235. Transfer function application module 235 applies the received compensation transfer functions 230 to print image data received from interpreter module 212 prior to performing halftoning at halftoning module 214. In one embodiment, a transfer function comprises a mapping of an input digital count (or tint) to an output digital count for a system, where digital count is the gray level or color value representing the pels in a bitmap 150 (FIG. 1). Transfer functions may be received or generated (e.g., generated based on target OD versus input digital count data and measured OD versus output digital count data).

Jet-Out Compensation

A jet-out is a print defect (e.g., pel forming element artifact) caused by a completely blocked (e.g., clogged) ink jet nozzle and the result is no ink deposited on the print medium when the blocked ink jet nozzle is instructed to fire. Other failure mechanisms may exist to cause a jet out that exhibit the same resulting lack of ejected drop.

In one embodiment, compensation module 216 receives print image measurement data corresponding to a first set of transfer functions associated with each of a plurality of functioning pel forming elements, a plurality of functioning pel forming elements and a plurality of tint levels. In such an embodiment, the plurality of functioning pel forming elements print with compensation transfer functions applied to pels adjacent to corresponding ones of the plurality of non-functioning pel forming elements. In a further embodiment, compensation module 216 associates measurement data values with corresponding ones of the plurality of non-functioning pel forming elements, corresponding compensation transfer functions and corresponding ones of the plurality of tint levels and determines optimal compensation by selecting the compensation transfer functions that have corresponding measurement data values closest to the compensation target values for each of the plurality of tint levels In an alternative embodiment, compensation module 216 receives print image measurement data corresponding to a plurality of non-functioning pel forming elements, a plurality of functioning pel forming elements and a plurality of tint levels. In this embodiment, the plurality of functioning pel forming elements print with compensated halftone designs applied to pels adjacent to corresponding ones of the plurality of non-functioning pel forming elements. In this embodiment, compensation module 216 associates measurement data values with corresponding ones of the plurality of non-functioning pel forming elements, corresponding compensation inverse transfer functions and corresponding ones of the plurality of tint levels and determines optimal compensation by selecting the compensation inverse transfer functions that have corresponding measurement data values closest to the compensation target values for each of the plurality of tint levels.

Figure 4:
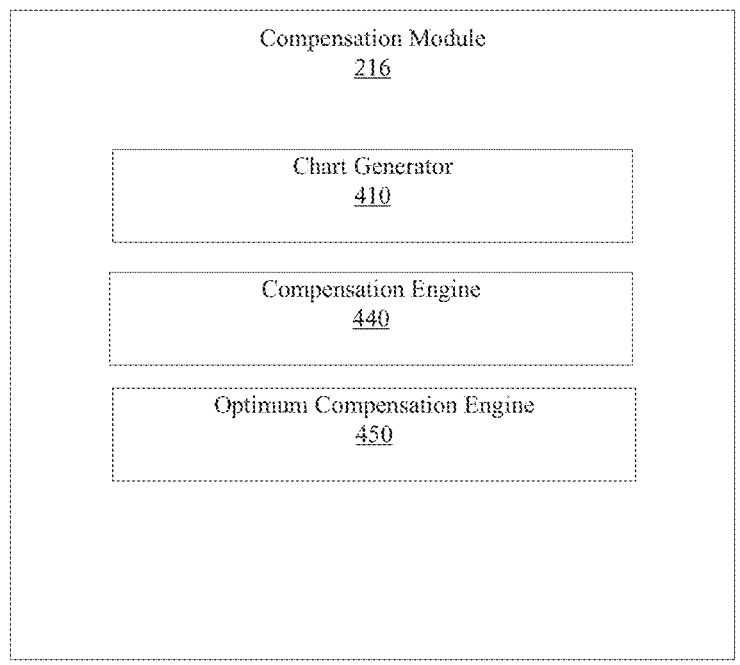
FIG. 4 illustrates one embodiment of compensation module.

FIG. 4 illustrates one embodiment of compensation module 216. As shown in FIG. 4, compensation module 216 includes a chart generator 410 implemented to print a test chart. In one embodiment, chart generator 410 generates a print image (e.g., print image for the test chart). According to one embodiment, the test chart comprises a number of simulated jet-outs for pel forming element 165 (e.g., 100 simulated jet-outs) on print medium 180.

Figure 3B:
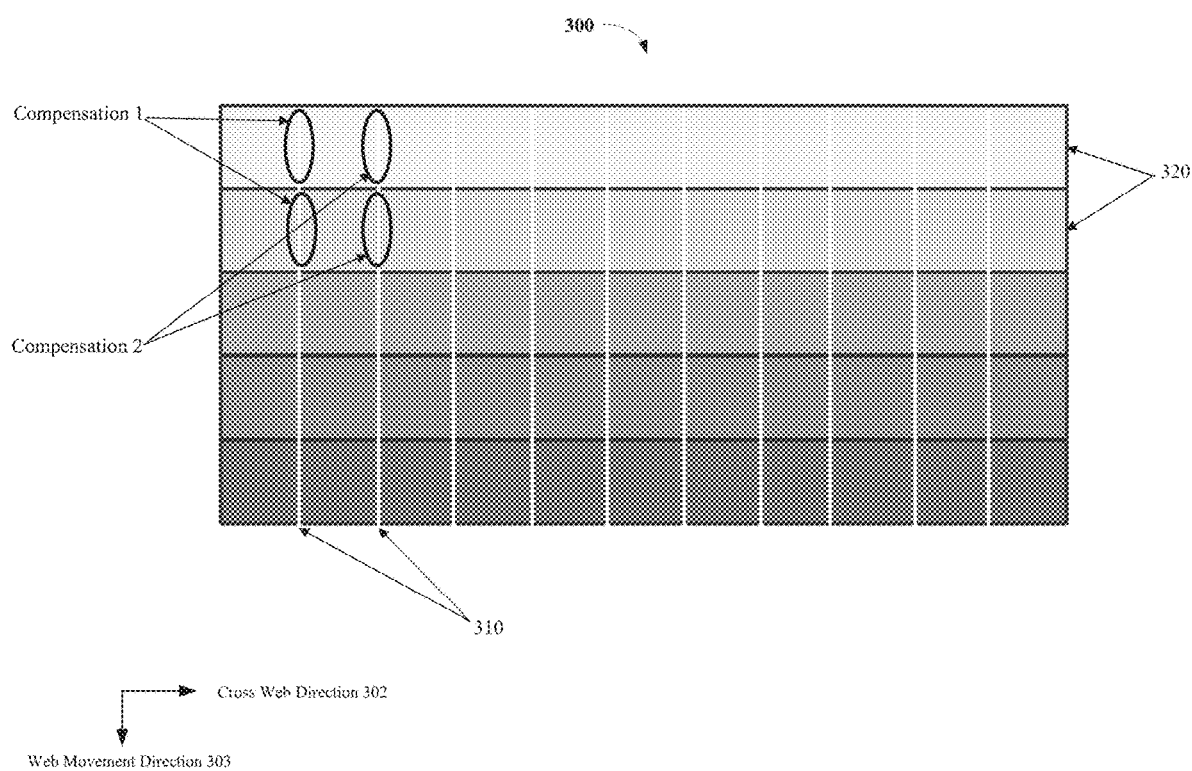
FIG. 3B illustrates one embodiment of a test chart.

FIG. 3B illustrates one embodiment of a test chart 300. As shown in FIG. 3B, test chart 300 includes columns 310 of simulated jet-outs (e.g., non-functioning pel forming elements) that run in a web movement direction 303. Additionally, test chart 300 includes rows of uniform tint level 320. In one embodiment, the tint levels may be the same in a cross web direction 302 or may vary in the web movement direction 303, where the cross web and web movement directions will be discussed in more detail below. In a further embodiment, compensation is applied to pel locations adjacent to the simulated jet outs. The applied compensation may vary in the cross web direction or may be the same in the web movement direction.

The test chart is created with print instructions processed by printing system 130. A simulated jet-out is created at a target pel forming element 165 location by print instructions that result in the target pel forming element not ejecting any ink drops. Pel forming elements adjacent to the simulated jet-out location are instructed to eject ink with an applied compensation level. Adjacent pel forming elements may be the 1, 2, 3, 4 or more pel forming element locations next to the simulated jet out nozzle location. The test chart may be designed to include the simulated jet-outs, different compensation levels applied to the adjacent pel forming elements, and different tint levels (e.g., digital counts) applied to the adjacent pel forming elements.

The test chart may further be designed with the simulated jet-outs staggered from each other in the cross web direction, the different compensation levels applied in the cross web direction (e.g., the applied compensation is the same in the web path direction), and the different tint levels applied in the web direction (e.g., the plurality of tint levels are the same in the cross web direction). A benefit of these test chart design element arrangements is a compact size of the printed test chart. In a further embodiment, the image of the printed test chart is measured by measurement module 190 (e.g., via a scanner). In such an embodiment, measurement module 190 generates print image measurement data across the web of the print medium and in the direction of the web movement for pel forming element 165.

Figure 5:
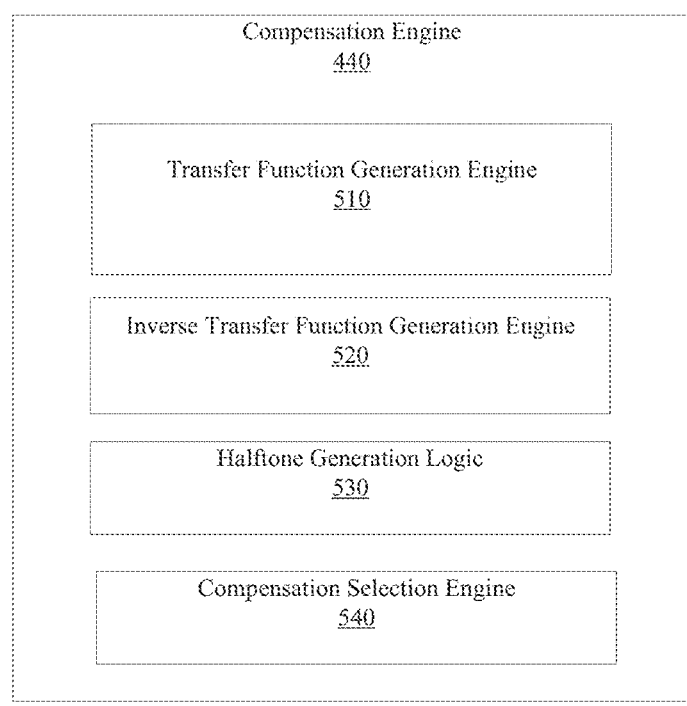
FIG. 5 illustrates one embodiment of compensation engine.

Compensation engine 440 performs uniformity compensation to generate compensation data (e.g., transfer functions or inverse transfer functions) based on the print image measurement data and compensation measurement data. FIG. 5 illustrates one embodiment of compensation engine 440. As shown in FIG. 5, compensation engine 440 includes transfer function generation engine 510 and inverse transfer function generation engine 520 that are used to generate transfer functions and inverse transfer functions (ITF), respectively, for each of the pel forming elements 165 based on measured data (e.g., measurement data 222) and a received or generated uniformity compensation baseline target (e.g., target 223) for each different tint level c.

Transfer function generation engine 510 generates transfer functions (e.g., uniformity compensation transfer functions) for each of the plurality of color planes. Inverse transfer function generation engine 520 generates inverse transfer functions for each of the plurality of color planes. Inverse transfer functions are used to transform (e.g., modify) the thresholds of a halftone threshold array. In one embodiment, inverse transfer functions may be derived from transfer functions.

Figure 6:
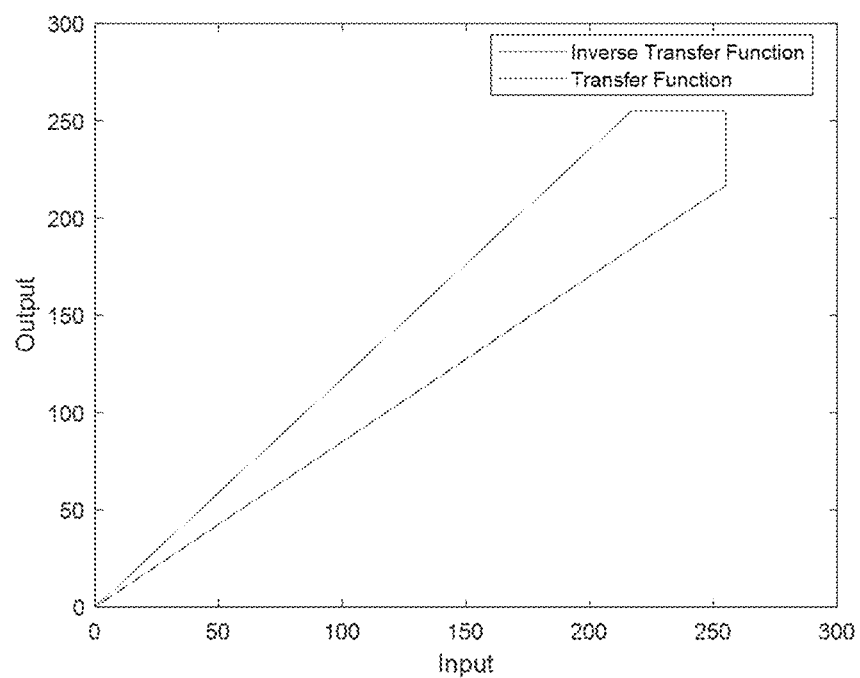
FIG. 6 illustrates one embodiment of an inverse transfer function for a nozzle.

FIG. 6 illustrates one embodiment of deriving an inverse transfer function from a transfer function of a nozzle for all digital count levels. As shown in FIG. 6, assuming the TF for a specific nozzle k is linear and represented by $TF_k$, then the inverse of the transfer function is given by $TF_k^{-1}$. ITF is a reflection of the TF about the identity Transfer function where OutputDC=InputDC. Thresholds transformed by the ITF which are equal to or greater than the largest digital count are replaced by the threshold value ($2^{\wedge}bitdepth-1$) assuming greater than halftoning equations, where bitdepth is the halftone threshold array bitdepth. This ensures that drop sizes for pels that never print using the input threshold array continue to not print when using the corrected/transformed threshold array. Greater than halftoning equations are defined as: 1) Large drop is emitted when contone image value>threshold array plane for large drops; 2) Medium drop is emitted when contone image value>threshold array plane for medium drops and contone image value<=threshold array plane for large drops; and 3) Small drop is emitted when the contone image value>threshold array plane for small drops and contone image value<=threshold array plane for medium. Analyzing these equations when the contone value equals $2^{\wedge}bitdepth-1$ and the threshold array value is equal to the placeholder value ($2 ^{\wedge}bitdepth-1$), or greater than terms for specific drop sizes are never satisfied. Therefore drop emission is inhibited for the drop size having placeholder thresholds producing a none drop size.

In one embodiment, the same color target is used for all nozzles to achieve uniform printing. In one embodiment, the input and output color values are the digital count (DC) levels, which are 0 to 255, for a typical 8-bit printing system. T(c) may be set the same for all nozzles to provide uniformity between all nozzles. The target T(c) represents the ideal level for each tint level c that would be achieved if the jet-out artifact is not present, viz. perfectly corrected.

Once inverse transfer functions have been generated, halftone generation logic 530 generates an updated uniformity compensated halftone by modifying all of the thresholds in each column of the threshold array of the current halftone using the generated inverse transfer function for each respective pel forming element 165. In one embodiment, the inverse transfer function for each column (or nozzle) (k) is used at each iteration to transform the current threshold values of the compensated halftone. This creates threshold values for the compensated halftone. This process generates thresholds in the compensated threshold array, based on the corresponding thresholds from the current threshold array.

Once generated at compensation engine 440, optimum compensation engine 450 processes the compensation data (e.g., uniformity compensation transfer functions and uniformity compensation inverse transfer functions) for each pel forming element 165 to determine an optimal compensation for each tint level. In one embodiment, optimal compensation comprises determining the optimal transfer function/inverse transfer function that is best for compensation. The family of candidate transfer functions/inverse transfer functions may be represented by $DCoutput=TF_k=(m_k*DCinput)$; or $DCoutput=ITF_k=(n_k*DCinput)$, where k is the nozzle number, and $m_k$ is the slope of the transfer function curve for nozzle k and $n_k$ is the slope of the inverse transfer function curve for nozzle k. In such an embodiment, an optimal compensation (e.g., optimal slope) obtained from the family of candidate transfer functions/candidate inverse transfer functions is used to compensate for each tint level for jet-outs that occur at a pel forming element 165.

Figure 7:
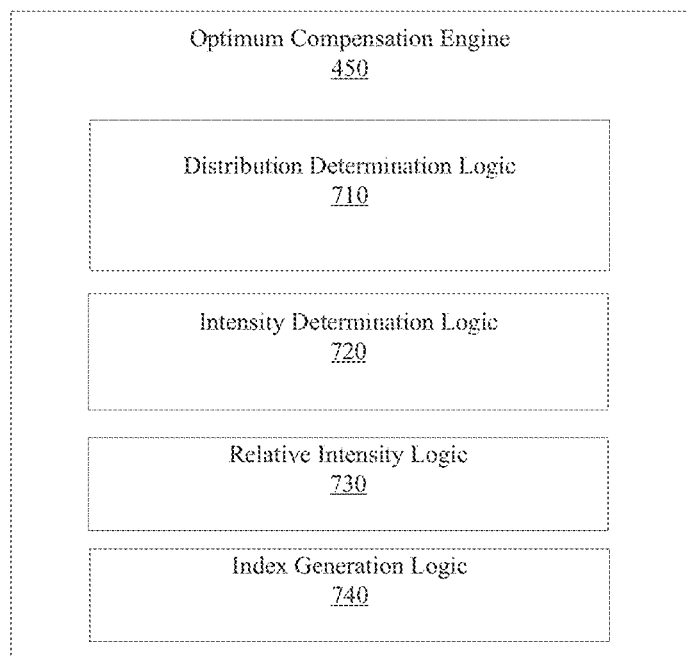
FIG. 7 illustrates one embodiment of an optimum compensation engine.

FIG. 7 illustrates one embodiment of an optimum compensation engine 450. As shown in FIG. 7, optimum compensation engine 450 includes distribution determination logic 710 that generates a plurality of distributions at each tint level for each pel forming element 165. In such an embodiment, distribution determination logic 710 generates a first distribution at each of a plurality of tint levels for pels in a first region surrounding a jet-out location (j) (e.g., j−3:j+3), generates a second distribution at each of the plurality of tint levels for pels in a second region before the jet-out location (e.g., j−10:j+4) and generates a third distribution at each of the plurality of tint levels for pels in a third region after the jet-out location (e.g., j+4:j+10), assuming a jet out location of j=0.

In one embodiment, the distributions describe values within the regions of measurement values. In this embodiment, the evaluated regions are generally spaced away from the jet-out and applied compensation (e.g., in the evaluated region, the pel forming elements print without compensation applied) so that a target baseline may be determined that yields the benefit of establishing a target response that is relative. By using regions of the measurement values to the immediate left (e.g., target baseline region 2) and right (e.g., target baseline region 1) of the simulated jet-out in the cross web direction to determine a target response, an improved target response (e.g. relative response) may be determined that yields the benefit of ignoring unrelated measurement variations in the cross web direction. As used herein, a distribution is defined as Gaussian distribution (or normal).

Intensity determination logic 720 generates a first average measurement value of the first distribution (e.g., the jet-out region), generates a second average measurement value of the second distribution (e.g., target baseline region 1) and generates a third average measurement value of the third distribution (e.g., target baseline region 2). Measurement responses are obtained by averaging measured image data (e.g., image intensity values) in the web movement direction for each tint level. In one embodiment, the first average measurement value represents an average intensity (e.g., mean of the normal fitted distribution) associated with the first region (M1), the second average measurement value represents an average intensity associated with the second region (M2) and the third average measurement value represents an average intensity associated with the third region (M3).

Relative Intensity logic 730 generates relative intensity values based on the first, second and third average measurement values. According to one embodiment, the relative intensity values are generated by determining a difference between the first average and the second average and a difference between the first average and the third average. Optimal compensation occurs when the average of the relative intensity values is minimum. In such an embodiment, a relative intensity between region 1 and 2 is represented as D1=(M1−M2), while the relative intensity between region 1 and 3 is represented as D2=(M1−M3). Since D1 and D2 are expected to be small in the best compensated jet-out location D1 and D2 are averaged, such that D=(D1+D2)/2. This results in a minimum D (average of the relative intensity values) in the best compensated jet-out location.

Index generation logic 740 generates an index associated with the compensation data and a relative intensity value. In one embodiment, a relative intensity value represents a proximity between the measurement response value (e.g., image intensity) to the target response (e.g., variance) for each of the plurality of tint levels. In one embodiment, the relative intensity values are associated with candidate transfer function or inverse transfer function slope data. The optimal index value points to the TF/ITF slope having the minimum variations between the three measured responses. An optimal index value is obtained for each tint level of the test chart. The index values are combined to determine a single index value (e.g. optimal slope) for the case of a single linear response.

Subsequently, optimum transfer function and/or inverse transfer function compensation data is generated to be used during production printing to compensate for each identified non-functioning pel forming element 165. In that case, identification of non-functioning elements is performed during production printing using conventional methods instead of using simulated jet outs. In halftone compensation embodiments, the inverse transfer function compensation data is implemented to generate compensated halftone designs by modifying halftone threshold arrays, which are transmitted to be used to compensate for defective pel forming elements 165.

Figure 8:
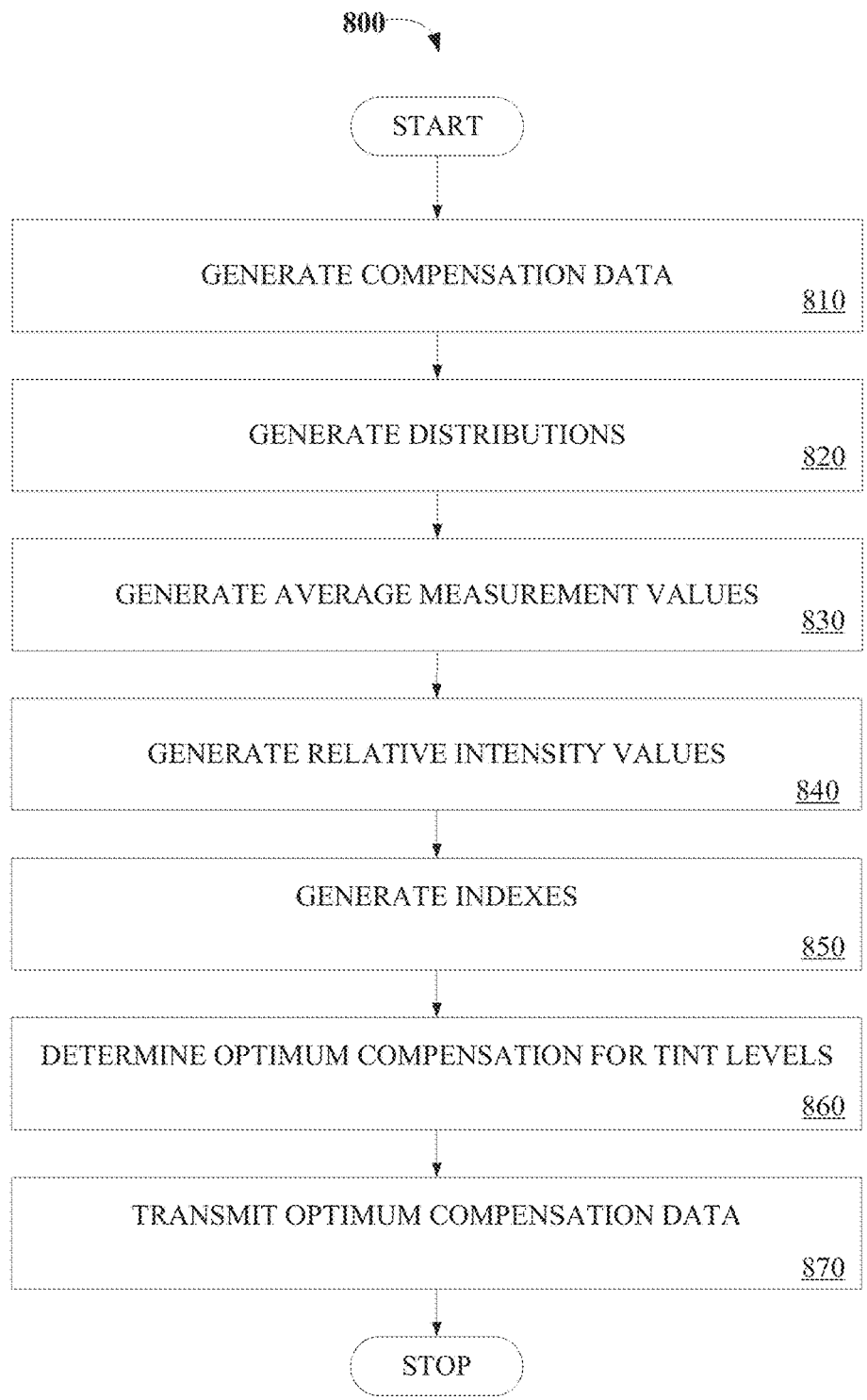
FIG. 8 is a flow diagram illustrating one embodiment of a process for determining an optimum compensation for defective pel forming elements.

FIG. 8 is a flow diagram illustrating a process 800 for determining an optimum compensation for defective pel forming elements 165. Process 800 may be performed by processing logic that may include hardware (e.g., circuitry, dedicated logic, programmable logic, microcode, etc.), software such as instructions run on a processing device, or a combination thereof. In one embodiment, process 800 is performed by compensation module 216.

At processing block 810, compensation data is generated for the candidate set (e.g., transfer functions, inverse transfer functions and halftone designs). At processing block 820, the distributions (e.g., surrounding, before and after the jet-out location) at each of a plurality of tint levels are generated. At processing block 830, the average measurement values associated with each average distribution are generated.

At processing block 840, relative intensity values are generated based on the first, second and third average measurement values. At processing block 850, indexes associated with the relative intensity values are generated for each of the plurality of tint levels. At processing block 860, optimum compensation data (e.g., transfer function or inverse transfer function) associated with each tint level is determined for each pel forming element. At processing block 870, the optimum compensation data is transmitted.

In an alternative embodiment, the optimum compensation data may be implemented to generate a single transfer function (or inverse transfer function) for each defective pel forming element 165 comprising a separate compensation level for each tint level. In this embodiment, the transfer function/inverse transfer function comprises a continuous piecewise linear transfer function/inverse transfer function including a plurality of compensation levels, where each compensation level corresponds to an index associated with a tint level. A benefit of generating and applying a continuous piecewise linear transfer function/inverse transfer function is greater compensation accuracy. In this case the TFs or ITFs are described by a set of piecewise linear functions where the optimal slopes for each piece are determined for each different tint level in the test chart. In this case the piecewise functions must be generated to represent a continuous function for all DC levels, hence a set of intercepts for each piece must also be generated to achieve continuity of the piecewise function.

The domain for each piece of the function corresponds to the tint levels in the test chart. DCoutput=$TF_{ki}$= ($m_{ki}$*DCinput)+$c_i$, where i denotes each segment of the piecewise function having intercept values $c_i$. Similarly for the ITF, DCoutput=$ITF_{ki}$=($n_{ki}$*DCinput)+$d_i$, where i denotes each segment of the piecewise function having intercept values $d_i$. The index values may be used to determine the optimal slopes for each piece of the piecewise linear functions. The set of intercept values must be determined to obtain continuous piecewise functions where each line segment matches the end points of the adjacent line segment.

Figure 9:
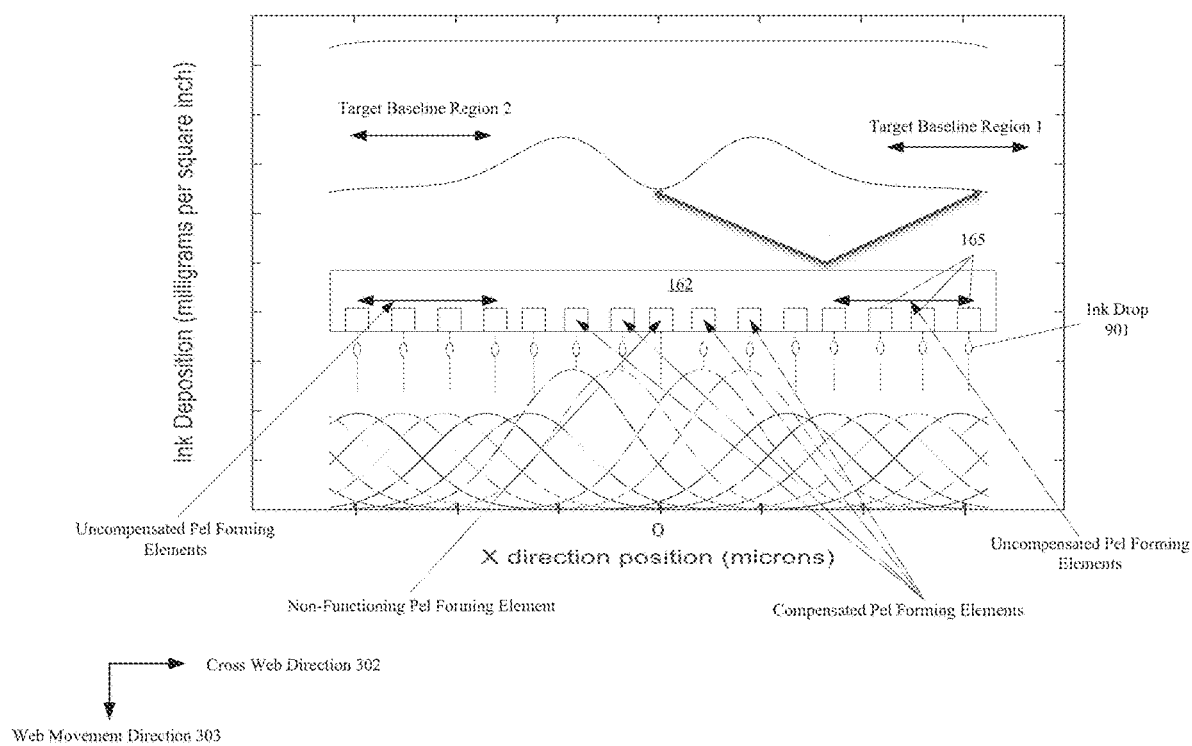
FIG. 9 illustrates one embodiment of a compensation of columns of threshold data relative to the location of a nozzle jet-out.

FIG. 9 illustrates one embodiment of a compensation of columns of threshold data relative to the location of a jet-out (e.g., non-functioning pel forming element). FIG. 9 shows a print head 162 including pel forming elements 165 that each generate ink drops 901, where each pel forming element is associated with a Gaussian profile ink distribution curve. In this example a jet-out is located at the middle of the plotted data (e.g., position x=0), the corresponding pel forming element 165 (e.g., a non-functioning pel forming element) ejects no ink drop 901 and the corresponding ink distribution is zero. Four Gaussians have been boosted in this example (e.g., pel forming elements with compensation applied), two on each side of jet-out, to compensate for the missing ink deposition created by the jet-out artifact. The compensation applied to these four compensated pel forming elements 165 (e.g., nozzles) at each DC (e.g., tint level) is obtained from the compensation transfer functions or compensation halftones as will be explained later. Uncompensated pel forming elements are located left of the left most compensated pel forming elements and to the right of the right most compensated pel forming elements. The uncompensated pel forming elements do not have compensation applied and their corresponding ink distributions can be seen to have lower values than the compensated ink distributions.

The curve in the middle shows the total ink deposition from all of the Gaussians at a specific DC level. The curve illustrates that the boosted output of four nozzles provided an increased ink deposition so that the level in the "valley" at the jet out location is equal to the ink deposition outside the jet-out region (e.g., near the edges). The curve at the top shows the ink deposition that occurs at DC level 255 without the jet-out. Without the jet-out compensation the set of Gaussians will all be the same and there will not be any boosted nozzle outputs. The measurement data 222 curve (not shown) corresponding to FIG. 9 would be similar to the middle total ink deposition curve (whether it is proportional or inverse proportional to the middle total ink deposition curve depends on the measurement data sensors and any data processing). The measurement data 222 curve will vary for each different tint level in the test chart. Cross web direction 302 indicates the X direction positions of the pel forming elements 165 and ink drops 901, while web movement direction 303 (e.g., web path direction) indicates the print medium direction of travel in relation to the pel forming elements 165 and ink drops 901.

Referring back to FIG. 5, compensation selection engine 540 receives the optimum compensation data and selects transfer functions or halftone designs based on defective pel forming elements 165 that have been detected. In one embodiment, information regarding defective pel forming elements 165 locations are received from a defective print element location engine 250 (FIG. 2). Pel forming element location refers to a unique identifier for the pel forming element 165 such as logical address or physical location on the corresponding printhead 162.

Figure 10:
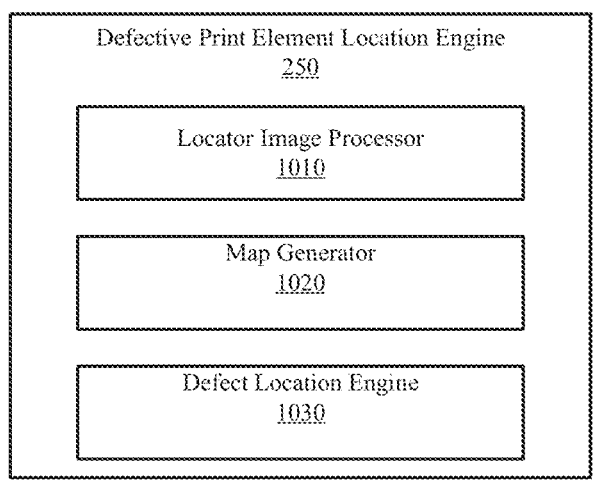
FIG. 10 illustrates one embodiment of defective print element location detector.

FIG. 10 illustrates one embodiment of defective print element location engine 250. According to one embodiment, defective print element location engine 250 identifies a list of defective print element locations associated with detected jet-outs (e.g., print defect pels locations). In such an embodiment, defective print element location engine 250 includes locator image processor 1010 to receive measurement data 222 (e.g., image scan data) of printed print medium 180 (via measurement module 190), analyzes the image scan data to detect jet-outs (e.g., print defects) associated with one or more defective pel forming elements 165 or other markings and their cross web direction position coordinates in the image based on measurement data 222 intensities and reference print information (e.g., an image of the instructed printed page) that corresponds to the measurement data 222. In this embodiment, this process is performed on the corresponding red, green and blue (RGB) channel for an individual color marking. In other embodiments, additional marks (e.g., locator marks) may be included in the printed print medium 180 to aid locator image processor 1010 in refining the location (e.g., positions) of jet-outs or markings.

Defective print element location engine 250 also includes map generator 1020 to generate a pel forming element map that maps the cross web direction positions of the pels of detected marks or print defects in the print image to the corresponding pel forming elements 165 based on the print instructions. In one embodiment, print instructions provide information regarding the pel forming elements 165 that contributed to printing the marks or print defects, which is then used to generate the map.

Map generator 1020 may also generate a pel forming element map that generally maps image pixel positions (e.g., locations) to additional corresponding pel forming elements 165 by estimating additional image pixel positions in addition to locator mark positions. The map is generated based on the locator mark pixel positions and the print instructions. The map may be further enhanced by generating the map using an estimation model (e.g., a pixel position estimation model) to provide additional image pixel positions in the cross web direction that are in addition to the locator mark positions in the cross web direction. By generating the map to include the additional cross web direction image pixel positions, the technical benefit of mapping additional image pixel positions to corresponding pel forming elements is realized.

Map generator 1020 may generate an estimation model using regression (e.g., linear regression) or interpolation (e.g., linear, piecewise, polynomial or spline interpolation) to facilitate generation of the pel forming element map. As a result, estimation is performed with the estimation model based on the positions of the locator marks to determine cross web direction positions of additional pixels of the print image.

Defect location engine 1030 identifies pel forming elements 165 locations associated with the print defect pels (e.g., defective pel forming element location list) based on the print defect pels locations and the pel forming element map. For example, the determination of the specific pel forming elements 165 locations related to the defect pel locations in the scanned image data is determined based on the pel forming element map. Once generated, the defective pel forming element locations may then be transmitted to compensation selection engine 540.

Figure 11A:
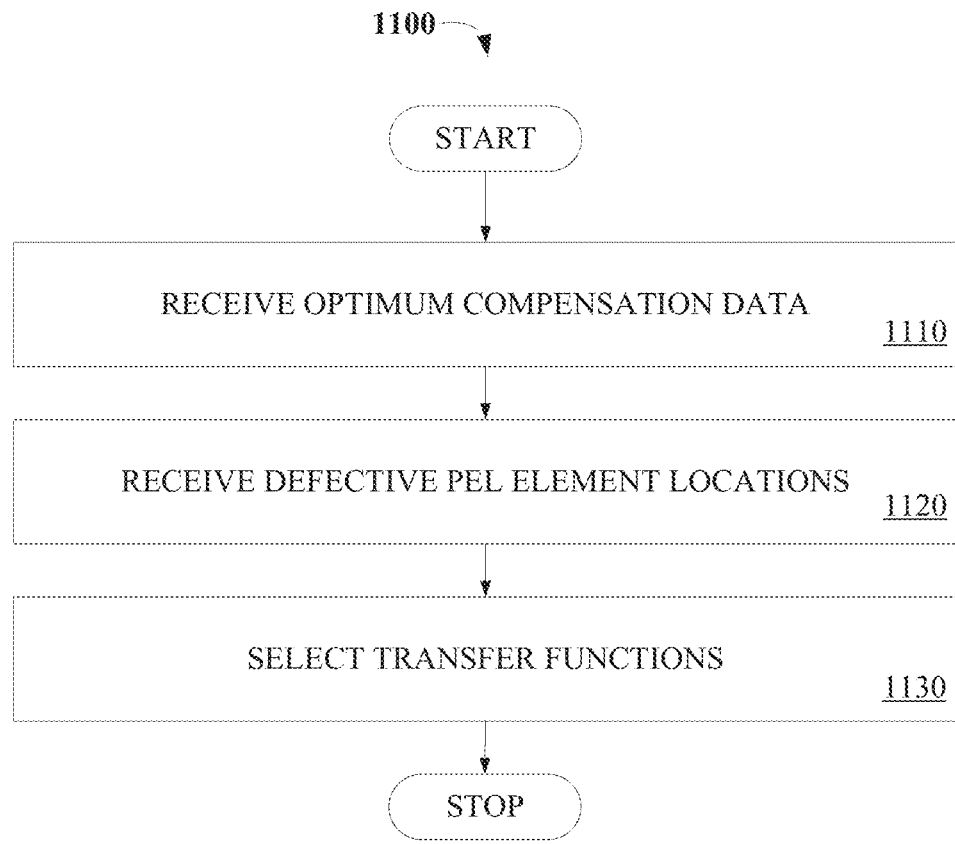
FIGS. 11A and 11B are flow diagrams illustrating embodiments of a process performed by a compensation selection engine.

FIG. 11A is a flow diagram illustrating a process 1100 for performing a compensation selection. Process 1100 may be performed by processing logic that may include hardware (e.g., circuitry, dedicated logic, programmable logic, microcode, etc.), software such as instructions run on a processing device, or a combination thereof. In one embodiment, process 1100 is performed by compensation selection engine 540.

At processing block 1110, optimum compensation data is received from optimum compensation engine 450. At processing block 1120, the defective pel elements 165 locations are received from defective print element location engine 250. At processing block 1130, transfer functions are selected for each tint level based on the optimum compensation data. However, in embodiments implementing piecewise linear transfer functions, a single continuous transfer function is selected having a plurality of compensation levels associated with each tint level. In addition to providing compensation, TF/ITFs transfer function selection may also be applied to inhibit the detected jet out nozzles from firing. This assures that the correction is maintained even in the case where the jet out nozzles become functional at some point in time. Disabling targeted (i.e., jet out) nozzles may be achieved by applying a TF that has all zeros, applying an ITF that is all placeholder values (2^bitdepth)−1 or by directly disabling the firing control for the nozzle.

Figure 11B:
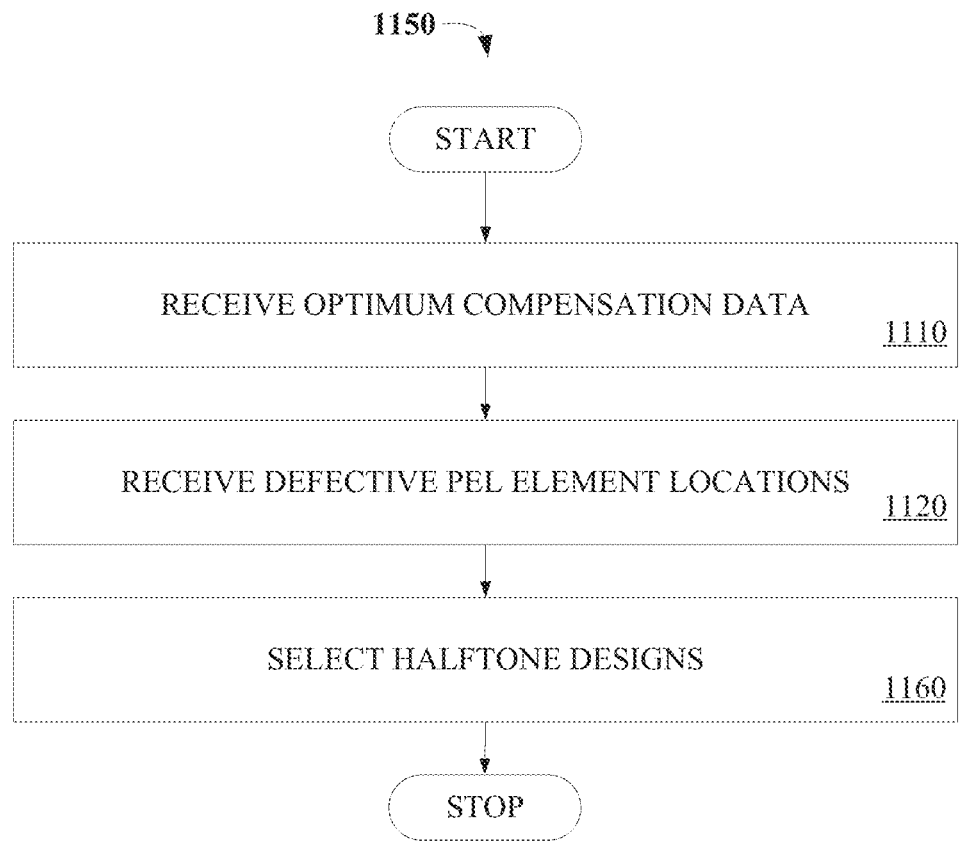

FIG. 11B is a flow diagram illustrating a process 1150 for performing a compensation selection. Process 1150 may be performed by processing logic that may include hardware (e.g., circuitry, dedicated logic, programmable logic, microcode, etc.), software such as instructions run on a processing device, or a combination thereof. In one embodiment, process 1150 is performed by compensation selection engine 540.

At processing block 1110, optimum compensation data is received from optimum compensation engine 450. At processing block 1120, the defective pel elements 165 are received from defective print element location engine 250. At processing block 1160, halftone designs are selected (e.g., based on inverse transfer functions for each tint level indicated by the optimum compensation data). However, in embodiments implementing piecewise linear transfer functions, a single halftone design is selected generated from a single inverse transfer function having a plurality of compensation levels associated with each tint level. The halftone selection process 1160 obtains replacement thresholds for the columns in the halftone threshold array that require compensation, where the corresponding compensation ITFs are used to generate the replacement thresholds.

Although shown as a component of print controller 140, other embodiments may feature compensation module 216 included within an independent device, or combination of devices, communicably coupled to print controller 140. For instance, FIG. 12 illustrates one embodiment of a compensation module 216 implemented in a network 1200.

Figure 12:
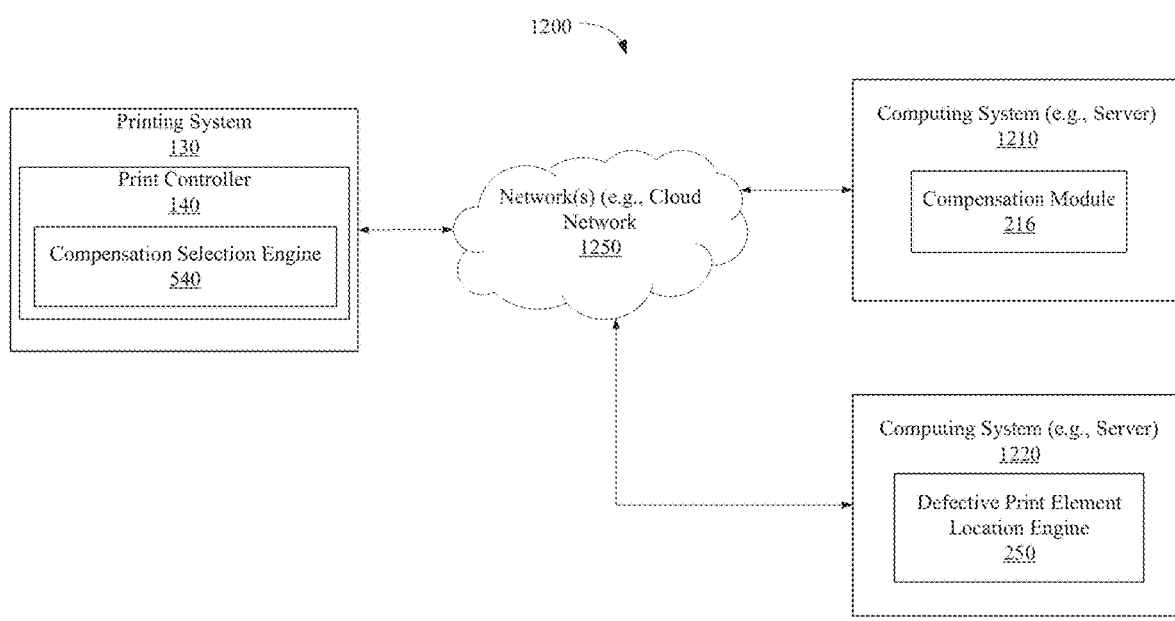
FIG. 12 illustrates one embodiment of a compensation module implemented in a network.

As shown in FIG. 12, compensation module 216 is included within a computing system 1210, defective print element location engine 250 is included within computing system 1220 and compensation selection engine 540 is included within printing system 130. In this embodiment, compensation selection engine 540 may receive transfer functions and/or halftone designs from compensation module 216 at computing system 1210 and defective pel forming elements 165 locations from defective print element location engine 250 at computing system 1220 via cloud network 1250.

Figure 13A:
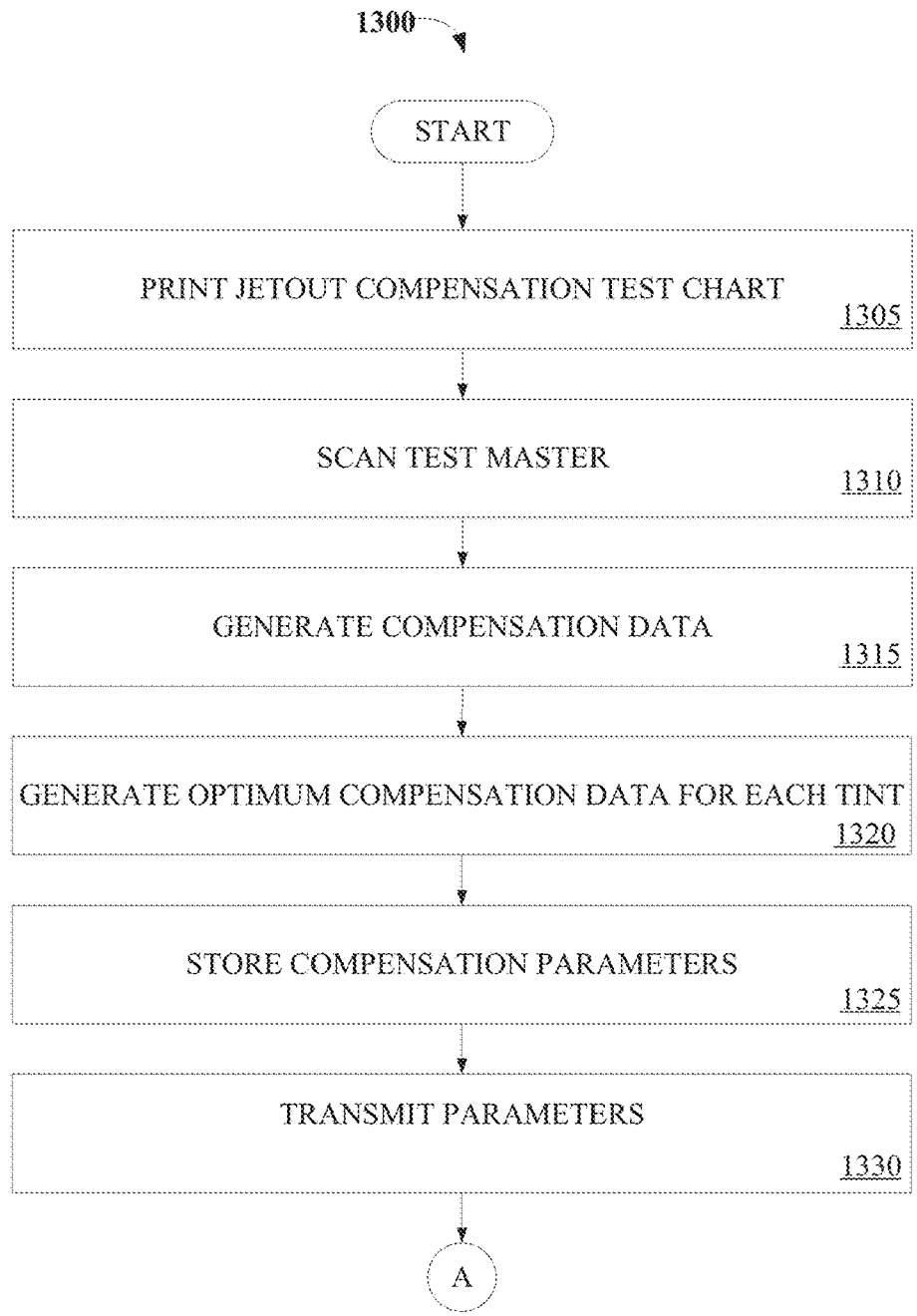
FIGS. 13A and 13B is flow diagram illustrating one embodiment of process performed in a network.
Figure 13B:
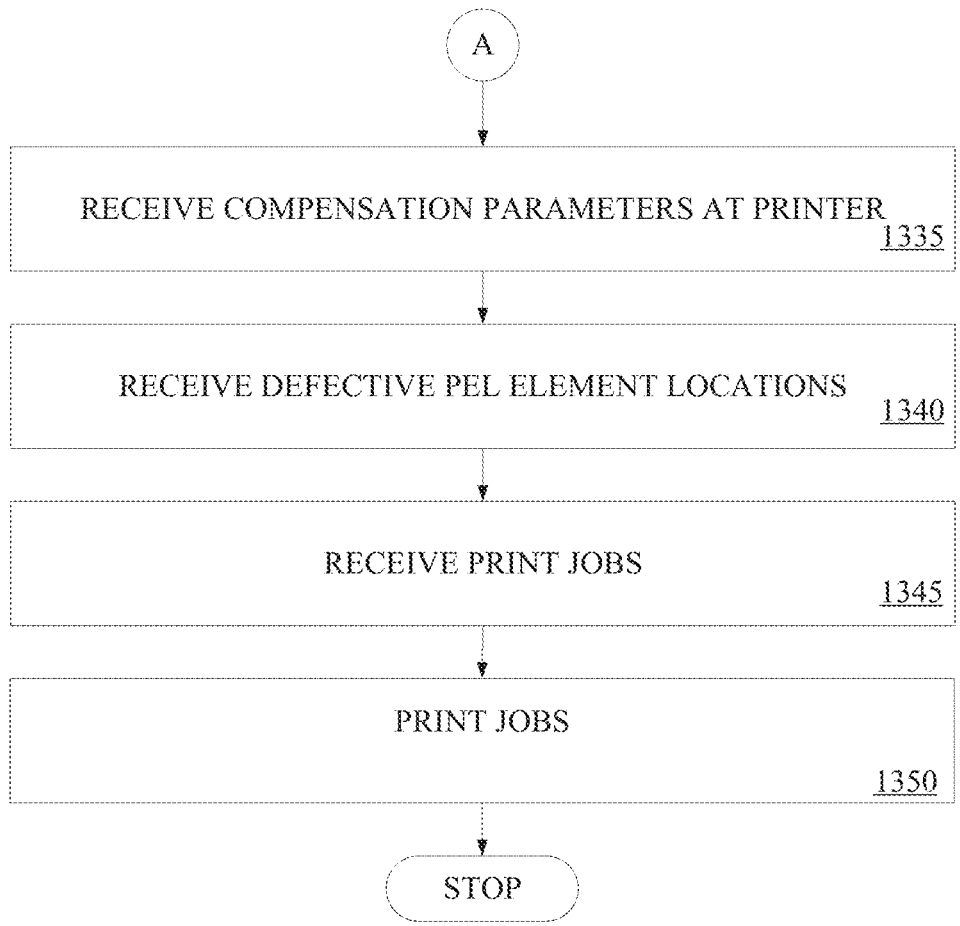

FIGS. 13A and 13B is flow diagram illustrating one embodiment of process 1300. Process 1300 may be performed by processing logic that may include hardware (e.g., circuitry, dedicated logic, programmable logic, microcode, etc.), software such as instructions run on a processing device, or a combination thereof. In one embodiment, process 1300 is performed by print engine 160, compensation module 260, defective print element location engine 250 and compensation selection engine 540.

In one embodiment, the processes in FIG. 13A occur offline prior to print production, while the processes in FIG. 13B occur during print production. At processing block 1305 (FIG. 13A), a jet-out compensation test chart (e.g., print image data) is printed. At processing block 1310, the test chart is scanned to generate print image measurement data. At processing block 1315, compensation data (e.g., transfer functions and inverse transfer functions) is generated. At processing block 1320, optimum compensation data is generated for each tint. At processing block 1325, compensation parameters are stored. In one embodiment, the compensation parameters comprise transfer functions associated with the optimum compensation data, as well as halftone designs generated using the inverse transfer functions.

At processing block 1335 (FIG. 12B), the compensation parameters (e.g., transfer functions and halftone designs) are received at a printer (e.g., print engine 165). At processing block 1340, defective pel element 165 locations are received (e.g., from defective print element location engine 250). At processing block 1345, print jobs are received. At processing block 1350, the jobs are printed using the compensation parameters.

Figure 14:
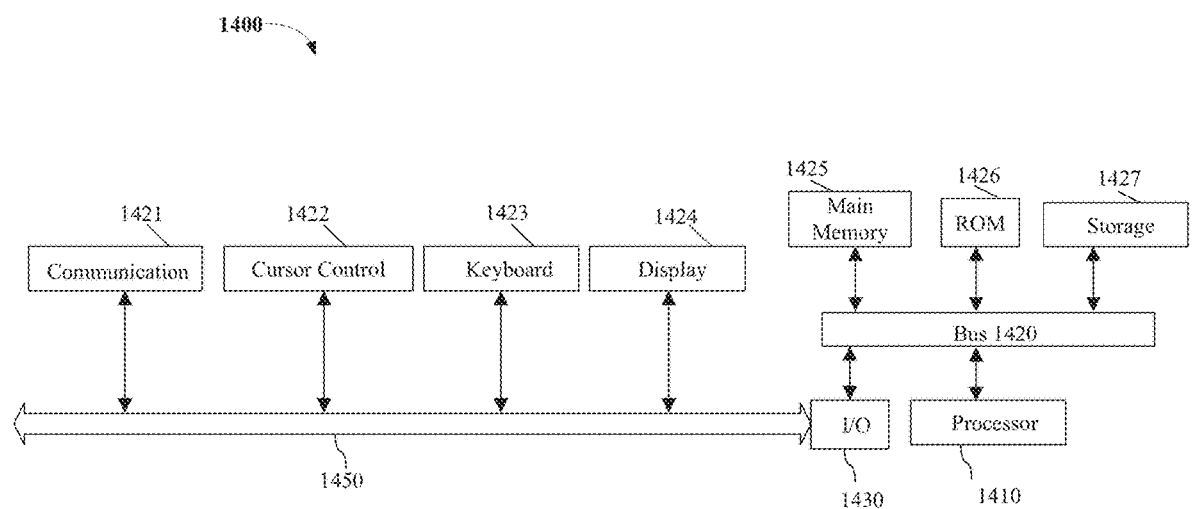
FIG. 14 illustrates one embodiment of a computer system.

FIG. 14 illustrates a computer system 1400 on which printing system 130, print controller 140, defective print element location engine 250, compensation module 216 and/or compensation selection engine 540 may be implemented. Computer system 1400 includes a system bus 1420 for communicating information, and a processor 1410 coupled to bus 1420 for processing information.

Computer system 1400 further comprises a random access memory (RAM) or other dynamic storage device 1425 (referred to herein as main memory), coupled to bus 1420 for storing information and instructions to be executed by processor 1410. Main memory 1425 also may be used for storing temporary variables or other intermediate information during execution of instructions by processor 1410. Computer system 1400 also may include a read only memory (ROM) and or other static storage device 1426 coupled to bus 1420 for storing static information and instructions used by processor 1410.

A data storage device 1427 such as a magnetic disk or optical disc and its corresponding drive may also be coupled to computer system 1400 for storing information and instructions. Computer system 1400 can also be coupled to a second I/O bus 1450 via an I/O interface 1430. A plurality of I/O devices may be coupled to I/O bus 1450, including a display device 1424, an input device (e.g., an alphanumeric input device 1423 and or a cursor control device 1422). The communication device 1421 is for accessing other computers (servers or clients). The communication device 1421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store compensation logic and one or more processors coupled with the at least one physical memory device to execute the compensation logic to receive measurement data corresponding to a print medium printed with a plurality of non-functioning pel forming elements, a plurality of functioning pel forming elements and a plurality of tint levels; wherein adjacent ones of the plurality of functioning pel forming elements print with compensation transfer functions applied and are located adjacent to the plurality of non-functioning pel forming elements, associate measurement data with the plurality of non-functioning pel forming elements, the compensation transfer functions and the plurality of tint levels and determine optimal compensation by selecting the compensation transfer functions that have corresponding measurement data values closest to compensation target values for each of the plurality of tint levels.

Example 2 includes the subject matter of Example 1, wherein determining the optimal compensation further comprises determining the compensation target values based on measurement data values corresponding to baseline regions, wherein the baseline regions correspond to others of the plurality of functioning pel forming elements that print without the compensation transfer functions applied.

Example 3 includes the subject matter of Examples 1 and 2, wherein determining the optimal compensation further comprises determining the compensation target values based on measurement data values corresponding to the baseline regions located on both sides of the non-functioning pel forming elements in the cross web direction.

Example 4 includes the subject matter of Examples 1-3, wherein the measurement data values are intensity values.

Example 5 includes the subject matter of Examples 1-4, wherein the plurality of tint levels in the measurement data are the same in the cross web direction.

Example 6 includes the subject matter of Examples 1-5, wherein the compensation transfer functions are the same in the web path direction.

Example 7 includes the subject matter of Examples 1-6, wherein the compensation logic generates a first compensation transfer function, wherein the first compensation transfer function comprises a piecewise linear transfer function comprising a plurality of compensation levels, wherein each compensation level corresponds to an optimal compensation associated with each of the plurality of tint levels.

Example 8 includes the subject matter of Examples 1-7, further comprising a print engine including the plurality of functioning pel forming elements.

Some embodiments pertain to Example 9 that includes at least one computer readable medium having instructions stored thereon, which when executed by one or more processors, cause the processors to execute the compensation logic to receive measurement data corresponding to a print medium printed with a plurality of non-functioning pel forming elements, a plurality of functioning pel forming elements and a plurality of tint levels; wherein adjacent ones of the plurality of functioning pel forming elements print with compensation transfer functions applied and are located adjacent to the plurality of non-functioning pel forming elements, associate measurement data with the plurality of non-functioning pel forming elements, the compensation transfer functions and the plurality of tint levels and determine optimal compensation by selecting the compensation transfer functions that have corresponding measurement data values closest to compensation target values for each of the plurality of tint levels.

Example 10 includes the subject matter of Example 9, wherein determining the optimal compensation further comprises determining the compensation target values based on measurement data values corresponding to baseline regions, wherein the baseline regions correspond to others of the plurality of functioning pel forming elements that print without the compensation transfer functions applied.

Example 11 includes the subject matter of Examples 9 and 10, wherein determining the optimal compensation further comprises determining the compensation target values based on measurement data values corresponding to the baseline regions located on both sides of the non-functioning pel forming elements in the cross web direction.

Example 12 includes the subject matter of Examples 9-11, wherein the measurement data values are intensity values.

Example 13 includes the subject matter of Examples 9-12, wherein the plurality of tint levels in the measurement data are the same in the cross web direction.

Example 14 includes the subject matter of Examples 9-13, having instructions stored thereon, which when executed by one or more processors, further cause the processors to generate a first compensation transfer function, wherein the first compensation transfer function comprises a piecewise linear transfer function comprising a plurality of compensation levels, wherein each compensation level corresponds to an optimal compensation associated with each of the plurality of tint levels.

Some embodiments pertain to Example 15 that includes a method comprising receiving measurement data corresponding to a print medium printed with a plurality of non-functioning pel forming elements, a plurality of functioning pel forming elements and a plurality of tint levels; wherein adjacent ones of the plurality of functioning pel forming elements print with compensation transfer functions applied and are located adjacent to the plurality of non-functioning pel forming elements, associating measurement data with the plurality of non-functioning pel forming elements, the compensation transfer functions and the plurality of tint levels and determining optimal compensation by selecting the compensation transfer functions that have corresponding measurement data values closest to compensation target values for each of the plurality of tint levels.

Example 16 includes the subject matter of Example 15, wherein determining the optimal compensation further comprises determining the compensation target values based on measurement data values corresponding to baseline regions, wherein the baseline regions correspond to others of the plurality of functioning pel forming elements that print without the compensation transfer functions applied.

Example 17 includes the subject matter of Examples 15 and 16, wherein determining the optimal compensation further comprises determining the compensation target values based on measurement data values corresponding to the baseline regions located on both sides of the non-functioning pel forming elements in the cross web direction.

Example 18 includes the subject matter of Examples 15-17, wherein the measurement data values are intensity values.

Example 19 includes the subject matter of Examples 15-8, wherein the plurality of tint levels in the measurement data are the same in the cross web direction.

Example 20 includes the subject matter of Examples 15-19, further comprising generating a first compensation transfer function, wherein the first compensation transfer function comprises a piecewise linear transfer function comprising a plurality of compensation levels, wherein each compensation level corresponds to an optimal compensation associated with each of the plurality of tint levels.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store compensation logic; and
   one or more processors coupled with the at least one physical memory device to execute the compensation logic to:
   receive measurement data corresponding to a print medium printed with a plurality of non-functioning pel forming elements, a plurality of functioning pel forming elements and a plurality of tint levels; wherein adjacent ones of the plurality of functioning pel forming elements print with compensation transfer functions applied and are located adjacent to the plurality of non-functioning pel forming elements;
   associate the measurement data with the plurality of non-functioning pel forming elements, the compensation transfer functions and the plurality of tint levels; and
   determine optimal compensation by selecting the compensation transfer functions that have corresponding measurement data values closest to compensation target values for each of the plurality of tint levels.

2. The system of claim 1, wherein determining the optimal compensation further comprises determining the compensation target values based on measurement data values corresponding to baseline regions, wherein the baseline regions correspond to others of the plurality of functioning pel forming elements that print without the compensation transfer functions applied.

3. The system of claim 2, wherein determining the optimal compensation further comprises determining the compensation target values based on measurement data values corresponding to the baseline regions located on both sides of the non-functioning pel forming elements in a cross web direction.

4. The system of claim 1, wherein the measurement data values are intensity values.

5. The system of claim 1, wherein the plurality of tint levels in a measurement data are the same in the cross web direction.

6. The system of claim 5, wherein the compensation transfer functions are a same in a web path direction.

7. The system of claim 1, wherein the compensation logic generates a first compensation transfer function, wherein the first compensation transfer function comprises a piecewise linear transfer function comprising a plurality of compensation levels, wherein each compensation level corresponds to an optimal compensation associated with each of the plurality of tint levels.

8. The system of claim 1, further comprising a print engine including the plurality of functioning pel forming elements.

9. At least one non-transitory computer readable medium having instructions stored thereon, which when executed by one or more processors, cause the processors to:
   receive measurement data corresponding to a print medium printed with a plurality of non-functioning pel forming elements, a plurality of functioning pel forming elements and a plurality of tint levels; wherein adjacent ones of the plurality of functioning pel forming elements print with compensation transfer functions applied and are located adjacent to the plurality of non-functioning pel forming elements;
   associate the measurement data with the plurality of non-functioning pel forming elements, the compensation transfer functions and the plurality of tint levels; and
   determine optimal compensation by selecting the compensation transfer functions that have corresponding measurement data values closest to compensation target values for each of the plurality of tint levels.

10. The non-transitory computer readable medium of claim 9, wherein determining the optimal compensation further comprises determining the compensation target values based on measurement data values corresponding to baseline regions, wherein the baseline regions correspond to others of the plurality of functioning pel forming elements that print without the compensation transfer functions applied.

11. The non-transitory computer readable medium of claim 10, wherein determining the optimal compensation further comprises determining the compensation target values based on measurement data values corresponding to the baseline regions located on both sides of the non-functioning pel forming elements in a cross web direction.

12. The non-transitory computer readable medium of claim 9, wherein the measurement data values comprise intensity values.

13. The non-transitory computer readable medium of claim 9, wherein the plurality of tint levels in the measurement data are the same in a cross web direction.

14. The non-transitory computer readable medium of claim 9, having instructions stored thereon, which when executed by one or more processors, further cause the processors to generate a first compensation transfer function, wherein the first compensation transfer function comprises a piecewise linear transfer function comprising a plurality of compensation levels, wherein each compensation level corresponds to an optimal compensation associated with each of the plurality of tint levels.

15. A method comprising:
receiving measurement data corresponding to a print medium printed with a plurality of non-functioning pel forming elements, a plurality of functioning pel forming elements and a plurality of tint levels; wherein adjacent ones of the plurality of functioning pel forming elements print with compensation transfer functions applied and are located adjacent to the plurality of non-functioning pel forming elements;
associating the measurement data with the plurality of non-functioning pel forming elements, the compensation transfer functions and the plurality of tint levels; and
determining optimal compensation by selecting the compensation transfer functions that have corresponding measurement data values closest to compensation target values for each of the plurality of tint levels.

16. The method of claim 15, wherein determining the optimal compensation further comprises determining the compensation target values based on measurement data values corresponding to baseline regions, wherein the baseline regions correspond to others of the plurality of functioning pel forming elements that print without the compensation transfer functions applied.

17. The method of claim 16, wherein determining the optimal compensation further comprises determining the compensation target values based on measurement data values corresponding to the baseline regions located on both sides of the non-functioning pel forming elements in a cross web direction.

18. The method of claim 15, wherein the measurement data values comprise intensity values.

19. The method of claim 15, wherein the plurality of tint levels in the measurement data are the same in a cross web direction.

20. The method of claim 15, further comprising generating a first compensation transfer function, wherein the first compensation transfer function comprises a piecewise linear transfer function comprising a plurality of compensation levels, wherein each compensation level corresponds to an optimal compensation associated with each of the plurality of tint levels.

* * * * *